United States Patent
Kolluru et al.

(10) Patent No.: US 12,155,679 B2
(45) Date of Patent: Nov. 26, 2024

(54) SESSION BASED ANOMALY DECTECTION

(71) Applicant: Traceable Inc., San Francisco, CA (US)

(72) Inventors: Avinash Kolluru, Bangalore (IN); Inon Shkedy, Fort Myers, FL (US); Ravindra Guntur, Hyderabad (IN); Shubham Jindal, Neemrana (IN)

(73) Assignee: Traceable Inc., San Francisco, CA (US)

( * ) Notice: Subject to any disclaimer, the term of this patent is extended or adjusted under 35 U.S.C. 154(b) by 391 days.

(21) Appl. No.: 17/567,785

(22) Filed: Jan. 3, 2022

(65) Prior Publication Data

US 2023/0224314 A1    Jul. 13, 2023

(51) Int. Cl.
*H04L 9/40* (2022.01)

(52) U.S. Cl.
CPC ........ *H04L 63/1425* (2013.01); *H04L 63/102* (2013.01); *H04L 63/1416* (2013.01); *H04L 63/1433* (2013.01); *H04L 63/20* (2013.01)

(58) Field of Classification Search
CPC .............. H04L 63/1425; H04L 63/102; H04L 63/1416; H04L 63/1433; H04L 63/20; H04L 63/168
See application file for complete search history.

(56) References Cited

U.S. PATENT DOCUMENTS

| | | | |
|---|---|---|---|
| 2014/0165140 A1* | 6/2014 | Singla | H04L 63/1416 726/1 |
| 2022/0318081 A1* | 10/2022 | Jindal | G06N 3/04 |
| 2022/0318332 A1* | 10/2022 | Jindal | G06F 9/543 |
| 2022/0318378 A1* | 10/2022 | Guntar | H04L 67/133 |
| 2022/0318618 A1* | 10/2022 | Guntar | H04L 67/133 |
| 2022/0321587 A1* | 10/2022 | Guntar | G06F 9/541 |
| 2023/0121137 A1* | 4/2023 | Munoz | H04L 65/1069 709/224 |
| 2023/0224318 A1* | 7/2023 | Shkedy | G06F 9/547 726/25 |

\* cited by examiner

*Primary Examiner* — Han Yang
(74) *Attorney, Agent, or Firm* — Riyon Harding

(57) ABSTRACT

A system that intercepts and analyzes application program interface (API) traffic, identifies correlations between components of API traffic, and uses those correlations to detect anomalous behaviors. API traffic, including requests and responses, is intercepted and analyzed to identify correlations in the API traffic. The correlations may be based on API traffic and can include a sequence of APIs, parameters passed between earlier and subsequent APIs, user roles within a user session and APIs accessed by the user roles, and other correlations. Correlation data for user sessions is generated and stored, and later compared to subsequent user session traffic. If the subsequent user session traffic does not comply with the correlations detected in earlier user sessions, an anomaly may be triggered.

18 Claims, 8 Drawing Sheets

|  | API responses providing parameter | | |
|---|---|---|---|
|  | A2 | A3 | A4 |
| A3 | Param ID | | |
| A4 | | Param ID | |
| A5 | | | |
|  | | | |
|  | | | |

API requests receiving parameter

FIGURE 6

SESSION BASED ANOMALY DECTECTION

BACKGROUND

Web-based applications have been subject to entity attacks that seek to improperly access data. Early attacks were based on viruses that could be identified as a specification file. Many modern attacks, however, are targeted towards application program interfaces (APIs), and cannot be detected by specification violations. Most security solutions on the market do not understand details of the operation for a particular API, but rather look for known patterns of exploitations. These are similar to antivirus market solutions based on file signatures. What is needed is an improved system for detecting security lapses in API systems.

SUMMARY

The present system, roughly described, intercepts and analyzes application program interface (API) traffic, identifies correlations between components of API traffic, and uses those correlations to detect anomalous behaviors. API traffic, including requests and responses, is intercepted and analyzed to identify correlations in the API traffic. The correlations may be based on API traffic and can include a sequence of APIs, parameters passed between earlier and subsequent APIs, user roles within a user session and APIs accessed by the user roles, and other correlations. Correlation data for user sessions is generated and stored, and later compared to subsequent user session traffic. If the subsequent user session traffic does not comply with the correlations detected in earlier user sessions, an anomaly may be triggered.

In some instances, a method performs session-based anomaly detection. The method begins with intercepting API traffic between a client and a server, wherein the API traffic is associated with multiple user sessions. The system then identifies a first user session identifier associated with one of the multiple user sessions, wherein the first user session is associated with a subset of the intercepted API traffic. Correlations are detected between a subset of the API traffic associated with the first user session, and correlation data based on the detected correlation is stored. The system then compares the correlation data to subsequently intercepted API traffic associated with a second user session, and determines whether the intercepted API traffic includes an anomaly based on the comparison with the correlation data.

In some instances, a non-transitory computer readable storage medium has embodied thereon a program that is executable by a processor to perform a method. The method performs session-based anomaly detection. The method begins with intercepting API traffic between a client and a server, wherein the API traffic is associated with multiple user sessions. The system then identifies a first user session identifier associated with one of the multiple user sessions, wherein the first user session is associated with a subset of the intercepted API traffic. Correlations are detected between a subset of the API traffic associated with the first user session, and correlation data based on the detected correlation is stored. The system then compares the correlation data to subsequently intercepted API traffic associated with a second user session, and determines whether the intercepted API traffic includes an anomaly based on the comparison with the correlation data.

In embodiments, a system can include a server, memory and one or more processors. One or more modules may be stored in memory and executed by the processors to intercept API traffic between a client and a server, the API traffic associated with multiple user sessions, identify a first user session identifier associated with one of the multiple user sessions, the first user session associated with a subset of the intercepted API traffic, detect correlations between a subset of the API traffic associated with the first user session, store correlation data based on the detected correlations, compare the correlation data to subsequently intercepted API traffic associated with a second user session, and determine whether the intercepted API traffic includes an anomaly based on the comparison with the correlation data.

BRIEF DESCRIPTION OF FIGURES

FIG. 6 illustrates an example matrix for tracking parameters passed between APIs.

DETAILED DESCRIPTION

The present system intercepts and analyzes application program interface (API) traffic, identifies correlations between components of API traffic, and uses those correlations to detect anomalous behaviors. API traffic, including requests and responses, is intercepted and analyzed to identify correlations in the API traffic. The correlations may be based on API traffic and can include a sequence of APIs, parameters passed between earlier and subsequent APIs, user roles within a user session and APIs accessed by the user roles, and other correlations. Correlation data for user sessions is generated and stored, and later compared to subsequent user session traffic. If the subsequent user session traffic does not comply with the correlations detected in earlier user sessions, an anomaly may be triggered.

API traffic is intercepted by one or more agents installed in one or more agents in one or more customer servers, machines, and/or environments. The API traffic includes all requests and responses (i.e., API traffic components) that are sent between a server and one or more clients or devices. The API traffic is analyzed to identify the API name (such as a URL), request and response content, including the request header and the response header, user identifier information, and other content.

API correlation data is generated and stored by the application server based on several user sessions. The intercepted traffic is analyzed to detect user identifiers. The API traffic associated with a particular user identifier is considered part of a user session. Correlations are detected for each user session, and correlation data based on correlations from several user sessions are generated and stored. Once generated, the correlation data is stored and compared to subsequent user session data to identify correlation anomalies. In some instances, the comparisons are made between correlation data and fresh intercepted traffic that have similar user sessions, such as for example a similar role, shopping for similar products, during similar time periods, or some other shared condition or parameter.

Figure 1:
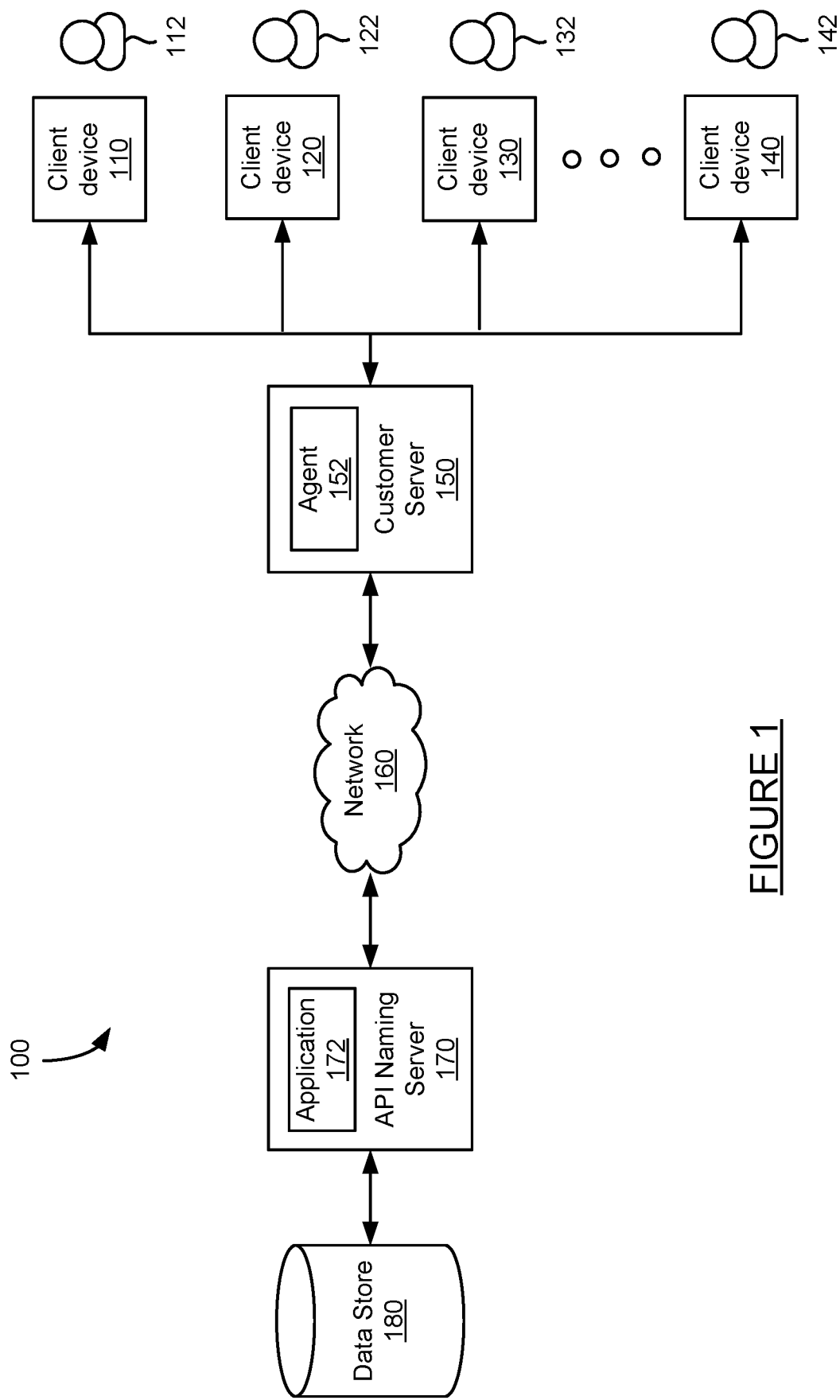
FIG. 1 is a block diagram of a system for performing session based anomaly detection.

FIG. 1 is a block diagram of a system for performing session based anomaly detection. The block diagram 100 of FIG. 1 includes client devices 110-140, customer server 150, network 160, Application server 170, and data store 180.

Client devices 110-140 may send API requests to and receive API responses from customer server 150. The client devices may be any device which can access the service, network page, webpage, or other content provided by customer server 150. Client devices 110-140 may send a request to customer server 150, for example to an API provided by customer server 150, and customer server 150 may send a response to the devices based on the request. The request may be sent to a particular URL provided by customer server 150 and the response may be sent from the server to the device in response to the request. Though only for four client devices are shown, a typical system may handle requests from a larger number of clients, for example, dozens, hundreds, or thousands, and any number of client devices may be used to interact with customer server 150.

Customer server 150 may provide a service to client devices 110-140. The service may be accessible through APIs provided by customer server 150. Agent 152 on customer server 150 may monitor the communication between customer server 150 and client devices 110-140 and intercept traffic transmitted between the server and the devices. Upon intercepting the traffic, agent 152 may forward the traffic to application 172 on application server 170. In some instances, one or more agents may be installed on customer server 150, which may be implemented by one or more physical or logical machines. In some instances, server 150 may actually be implemented by multiple servers in different locations, providing a distributed service for devices 110-140. In any case, one or more agents 152 may be installed to intercept API requests and responses between devices 110-140 and customer server 150, in some instances may aggregate the traffic by API request and response data, and may transmit request and response data to application 172 on server 170.

Network 140 may include one or more private networks, public networks, intranets, the Internet, an intranet, wide-area networks, local area networks, cellular networks, radio-frequency networks, Wi-Fi networks, any other network which may be used to transmit data, and any combination of these networks. Client devices 110-140, customer server 150, Application server 170, and data store 180 may all communicate over network 160 (whether or not labeled so in FIG. 1).

Application server 170 may be implemented as one or more physical or logical machines that provide functionality as described herein. In some instances, application server 170 may include one or more applications 172. The application 172 may be stored on one or more application servers 170 and be executed to perform functionality as described herein. Application server and application 172 may both communicate over network 160 with data store 180. Application 172 is discussed in more detail with respect to FIG. 2.

Data store 180 may be accessible by application server 170 and application 172. In some instance, data store 180 may include one or more APIs, API descriptions, metric data, and other data referenced and/or described herein. In some instance, data store 180 may be implemented as one or more data stores at one or more locations.

Figure 2:
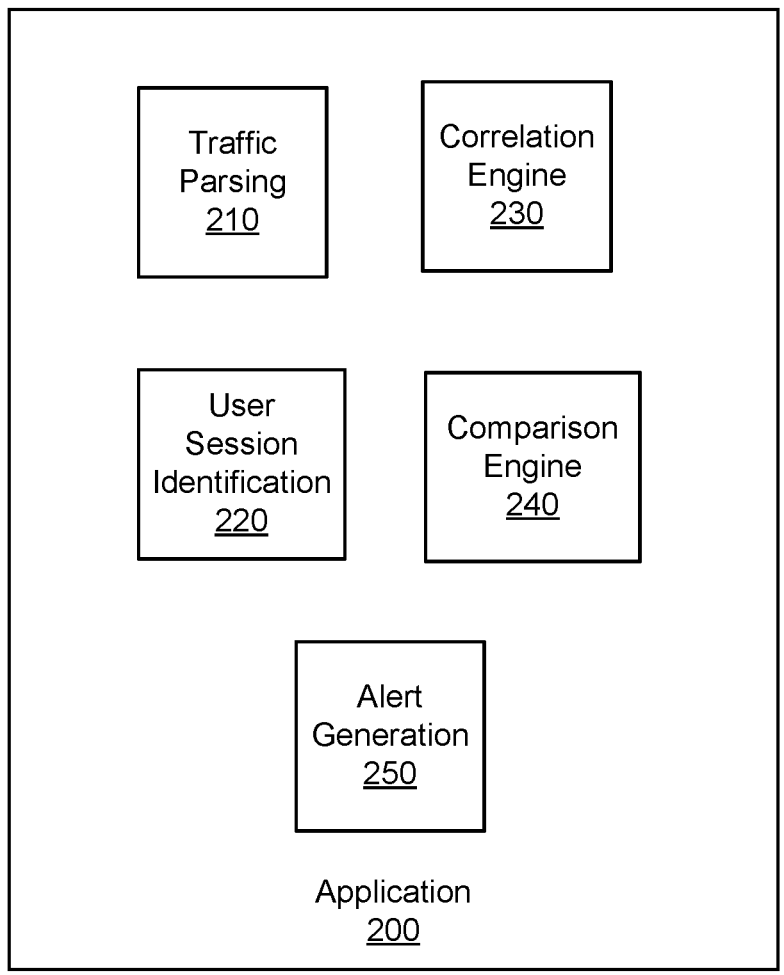
FIG. 2 is a block diagram of an application that automatically detects an anomaly for a user session.

FIG. 2 is a block diagram of an application that automatically detects an anomaly for a user session. Application 200 of FIG. 2 provides more detail for application 172 of the system of FIG. 1. Application 200 includes traffic parsing 210, user session identification 220, correlation engine 230, comparison engine 240, and alerts generation 250. Traffic parsing module 210 may parse intercepted traffic to identify a user identify and user session, API request data, API response data, and other data contained within traffic between a server and a client. In some instances, traffic parsing module 210 may retrieve data used to correlate a request and a response, data used to identify sequences of APIs, data used to identify user roles for a particular user session, and other data.

User session identification module 220 may identify a user session based on data retrieved from APIs, a client, or other data. User session identification 220 may implement multiple methods to determine a user session, for example from objects in an API request or response header, other header content, in a response received from an application, or other source of information. Identifying a user session is identified in more detail with respect to step 330 of FIG. 3 and the method of FIG. 4. Correlation engine 230 may identify correlations between APIs, identify API sequences, identify user roles within a user session, and create correlation data based on detected correlations.

Comparison engine 240 may compare APIs within a particular user session to correlation data detected from previous user sessions. The comparisons may include comparing API sequences, API parameters that are common to multiple API components (for example, an API request and an API response), user roles, and other correlation elements. Alert generation module 250 may generate an alert based on the results provided by comparison engine 240.

In some instances, the present system may report correlation comparison data and/or alert data through a dashboard. A dashboard manager with the application may generate and provide a dashboard to a user, for example as a webpage over network. The dashboard manager may coordinate graphics, perform analysis of correlation data, and provide an interface that can be interacted with by a user.

In some instances, more or fewer modules may be implemented in one or more applications to perform the functionality herein. The discussion of the modules with an applicality 200 is not intended to be limiting. The modules displayed can be combined, distributed, additional, or fewer modules then described, which will collectively perform the functionality described herein.

Figure 3:
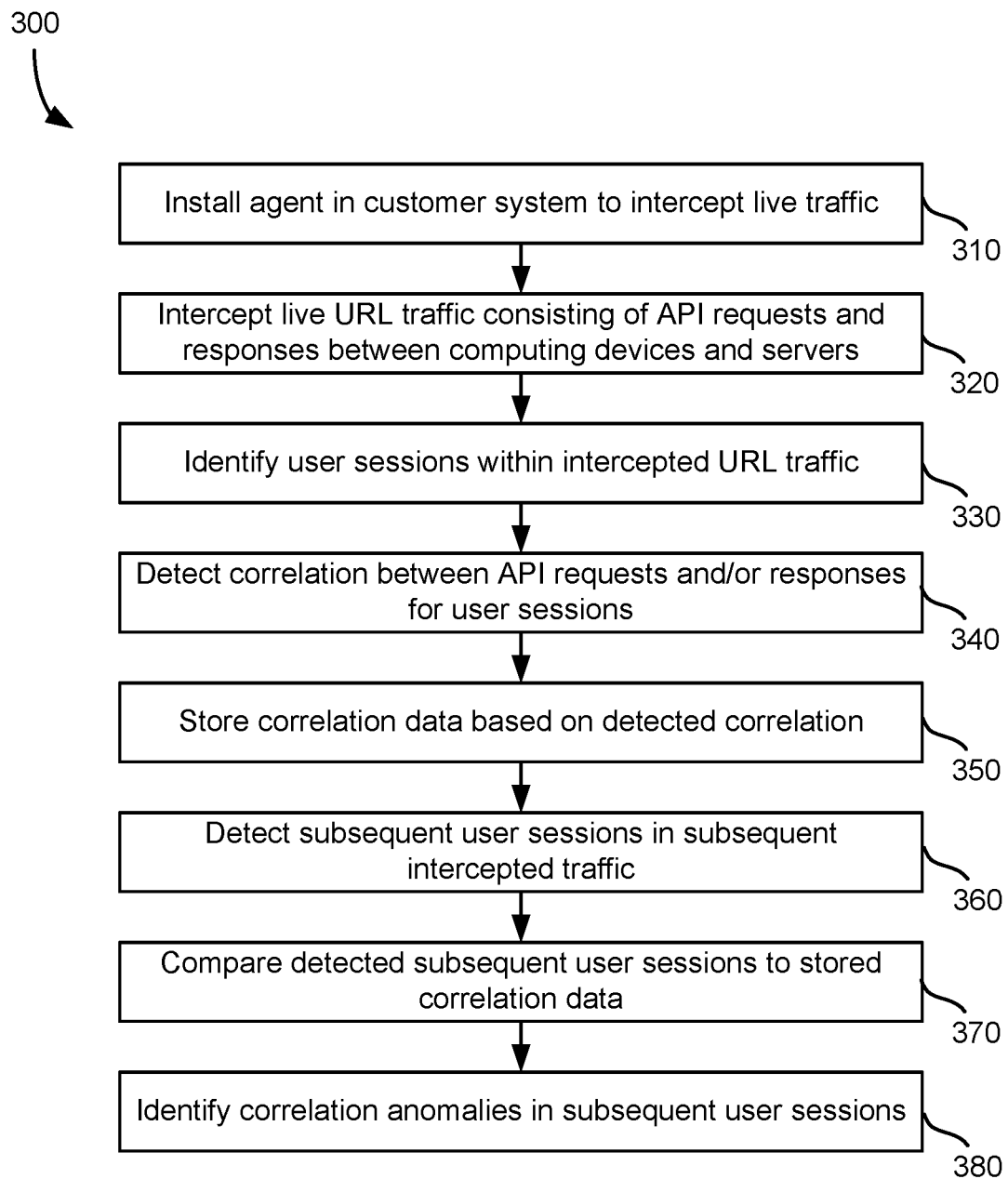
FIG. 3 is a method that automatically performs session based anomaly detection.

FIG. 3 is a method that automatically performs session based anomaly detection. First, agents are installed in a customer system to intercept live traffic at step 310. Live URL traffic consisting of API requests and responses can be intercepted between computing devices and servers by the agent at step 320. The agents may intercept the traffic, aggregate the intercepted traffic data, and send the data from the agent to an application periodically, in response to a push or pull event, or based on some other event. The intercepted data can be used to determine the metrics and information discussed herein, including correlation data, user session identification, and other data. For example, the time a request is received, the sender of the request, and request content can be collected by an agent. The processing of a request, including the response time, content of the response, request and/or response header information, and the destination of the response, can be intercepted by an agent as well. Relationships between sent responses and subsequent requests can also be intercepted by one or more agents.

User sessions within intercepted URL traffic are identified at step 330. User sessions may be identified using one or more methods, ranging from extracting a user ID from a token within a header, parsing a header, or retrieving user data from an API response. Once the user sessions are identified, correlations within the user session can be determined. More detail for identifying new user session is discussed with respect to the method of FIG. 4.

Correlations between API requests and responses are detected within user sessions at step 340. Detecting a correlation may include accessing intercepted API traffic and determining a sequence of APIs, identifying parameters passed from one API component to another (i.e., from a response to a subsequent request API component), and identifying user roles for user sessions. The correlations are generated for each user session, and stored for multiple user sessions to later identify anomalies. More details for detecting correlations between APIs for user sessions is discussed with respect to the method of FIG. 5.

The correlation data based on the detected correlations from step 340 is stored at step 350. The correlation data may include details from detected correlations and may be stored locally by an application, remotely by an agent, or at some other local or remote location. The correlation data may identify API sequences that typically occur for a user session, outputs from an API response that are used in a subsequent API request, whether the request occurs immediately after or sometime after the response, identified user roles for a user session, and other data. The correlation day may be generated based on a threshold number of occurrences (such as for example at least 50 occurrences) and be observed for several different user identifies.

Subsequent user sessions in subsequent intercepted traffic are detected at step 360. The user sessions are detected in a similar manner as that described with respect to steps 320 and 330 to identify previous user sessions, but are performed on subsequent traffic after correlation data has been detected and stored. The detected subsequent user sessions are compared to stored correlation data at step 370. The comparisons determine if the user session APIs comply with the detected correlations. For example, the comparison may determine if a sequence of APIs in the subsequent user session matches a sequence of APIs in the stored correlation data. The comparison may also determine whether outputs from an API and using a subsequent API component are similar to how the API outputs are used in subsequent API inputs in the stored correlation data. The user role for the subsequent user session is also compared to the user roles in the previous correlation data, and can be used to identify whether the APIs and request made by the user are consistent with the user role.

Correlation anomalies are identified in subsequent user sessions at step 380. After comparing the detected subsequent user sessions to stored correlation data, an anomaly may be detected if the detected subsequent user session data varies enough from the stored correlation data to trigger an anomaly. In some instances, any difference in API sequence, parameter pass along, or user roles may trigger an anomaly. In in some instances, the larger the degree of difference between the detected subsequent user sessions and stored correlation data, the more urgent the level of anomaly will be, for example a red alert for a large difference, orange alert for a lesser difference, and yellow or no alert for a very minor difference.

Figure 4:
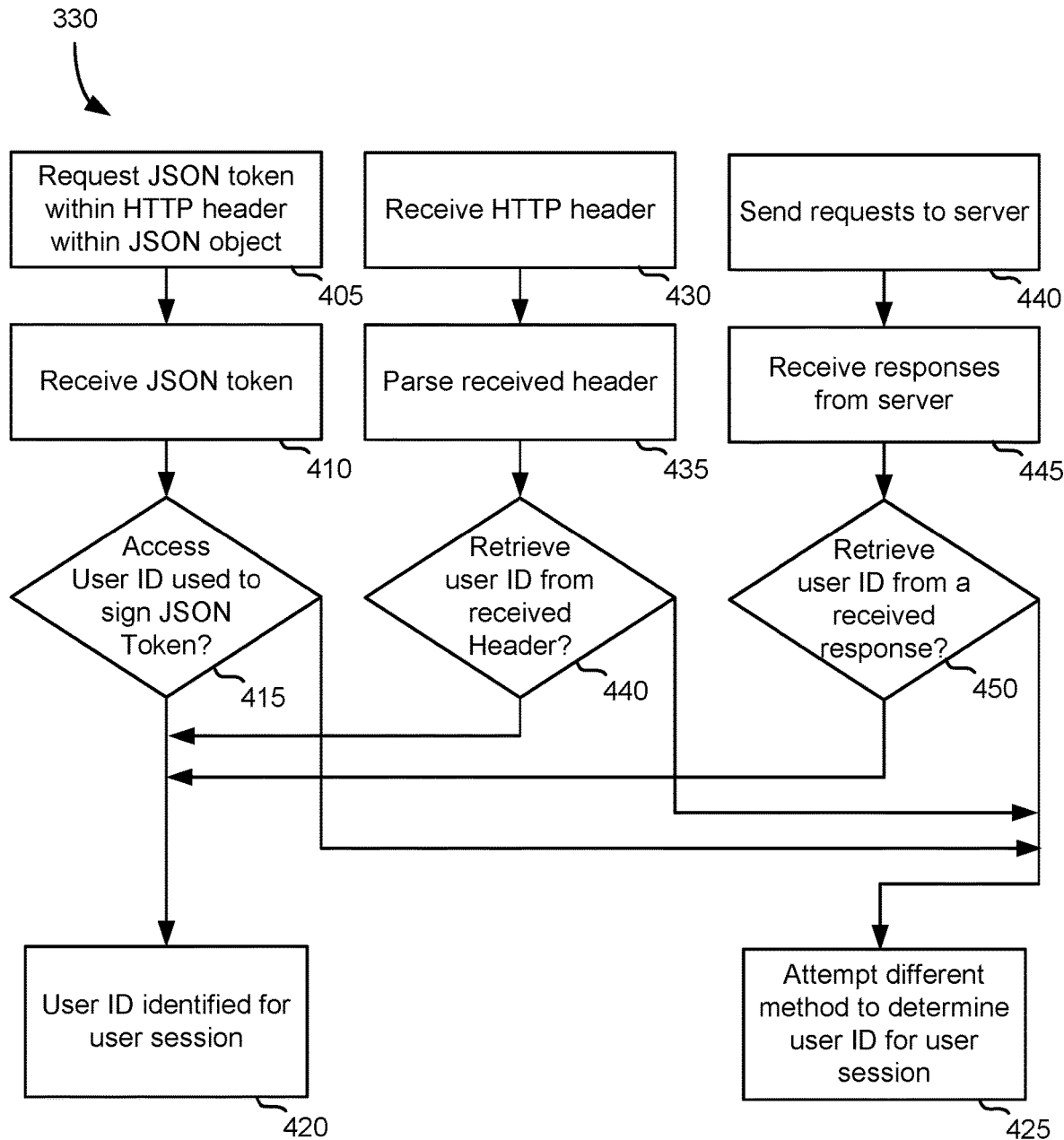
FIG. 4 is a method for identifying user sessions within intercepted URL traffic.

FIG. 4 is a method for identifying user sessions within intercepted URL traffic. The method of FIG. 4 provides more detail for step 330 of the method of FIG. 3. A user session may be associated with a particular user identifier (ID). Hence, to identity a user session, a user ID is first identified. In some instances, a user session may be identified in one of several methods. If one particular method does not result in successfully determining a user session, and other that can be performed. The method of FIG. 4 provides three methods for determining a user session. The first method begins at step 405, where a JSON token can be requested from within an HTTP header within a JSON object. An API request header can include a JSON object that includes a JSON token. In some instances, the JSON token may be signed by the user identifier (ID). The JSON token is received at step 410, and a determination is made as to whether JSON token is signed with a user ID at step 415. If the JSON token is signed with a user ID, the user ID is identified for the particular user session at step 420. If the JSON token is not signed with a user ID, a different method may be performed to determine a user ID and corresponding user session at step 425. The other methods may include methods that begin at step 430 and step 440.

Another method for identifying a user session begins with receiving an HTTP header at step 430. The received header is parsed at step 435. A determination is made as to whether a user ID is retrieved from the received and parsed header at step 440. If the user ID is received from the parsed header, user ID is identified for the user session at step 420. If the user ID is not retrieved from the parsed header, a different method may be used to determine user ID for the user session at 425.

Another method for identifying user session begins with sending a request to a server by one or more client devices at step 440. Responses will be received as part of the back and forth traffic between a client and the server at step 445. A response may be based on the request at step 440 or a subsequently sent request. In some instances, 10 to 20 responses may be received from the server as part of the API traffic after an initial request is sent at step 440. A determination is made as whether a user ID is received from one of the received responses within the API traffic at step 450. In some instances, a client is provided with a known user ID within a session at some point. An application will often provide the user ID to the client in a response during the session. As such, the system may continue to monitor and parse responses to determine if a user ID is included in one of the responses. If the user ID is detected in the received response at step 450, the user ID is determined to be identified for a user session at step 420. If a user ID is not retrieved from the received response, the system may attempt a different method to determine a user ID for the user session at step 425.

Figure 5:
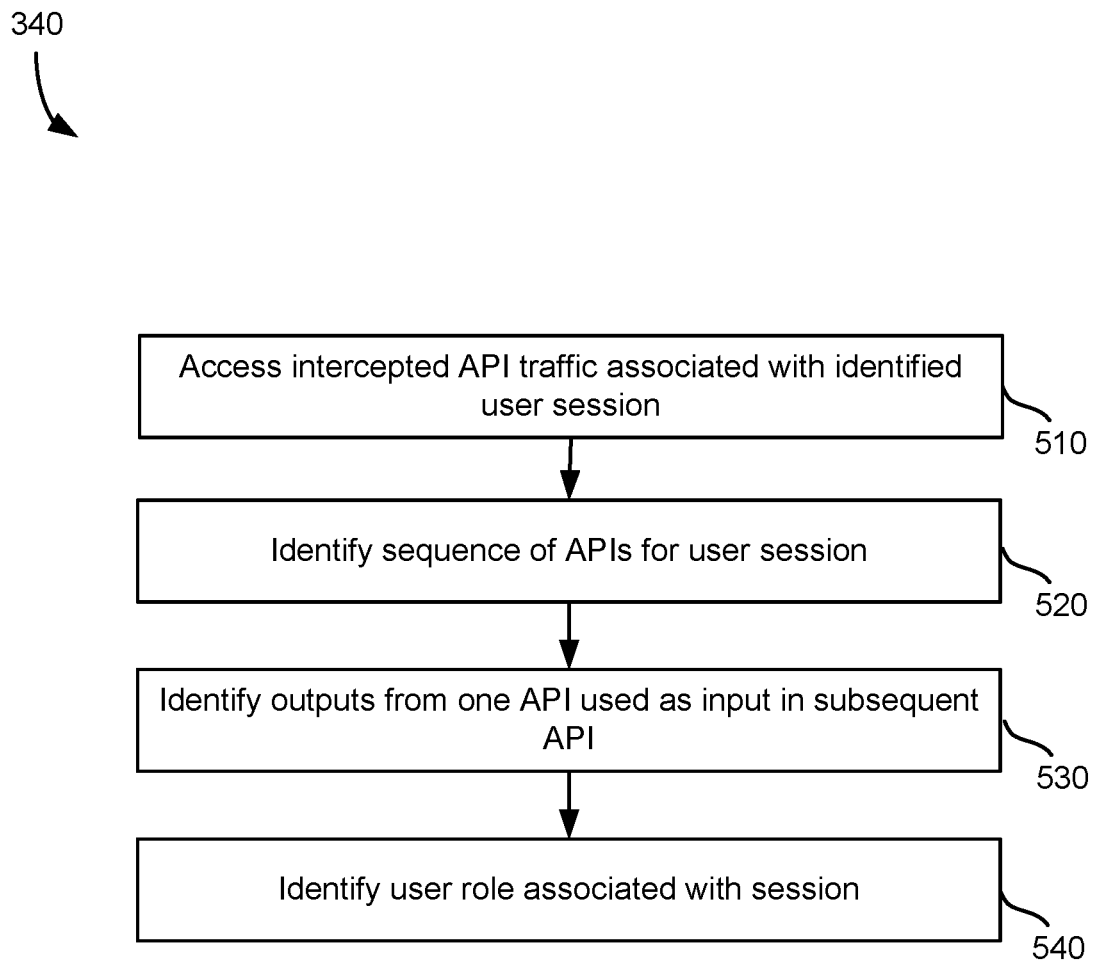
FIG. 5 is a method for detecting correlation between API requests and responses for user sessions.

FIG. 5 is a method for detecting correlation between API requests and responses for user sessions. The method of FIG. 5 provides more detail of step 340 the method of FIG. 4. Intercepted API traffic associated with the identified user session is accessed at step 510. From the accessed and intercepted API traffic, a sequence of APIs is identified for the user session at step 520. The sequence of APIs may include a number of APIs in a particular order. In some instances, the API sequence need not be uninterrupted, but should be in a particular order. For example, a sequence of APIs may include APIs A, B and C, a detected sequence may of APIs may require that API A always occurs before API B, and API B should occur before API C, but one or more other APIs may occur between APIs A and B and between APIs B and C. The sequence of APIs may specify the order of the APIs as well as a number of APIs that typically occur together within a user session.

Outputs from one API that are used as input to a subsequent API are identified at step 530. In some instances, a subsequent API request may use data contained in a previous API response. For example, a first API request consisting of a search of products for purchase on a website may return one or more product identifiers in an API response. In a subsequent API request, a user may select one of the identified products to add to the user's cart within the e-commerce website. In this example, the product identifier provided in a response may be included in a subsequent request.

In some instances, relations between parameters and shared between APIs may be stored in a matrix. FIG. 6 illustrates an example matrix for tracking parameters passed between APIs. For example, the matrix may include a first column listing of API identifiers representing requests and a second row listing API identifiers represents responses. For each row, a parameter identifier is listed in the column according to the API identifier that uses the parameter in which the parameter was first received. For example, if API A3 uses a parameter from API A2, then in the row for the API A3, the parameter identifier would appear in the cell according to the row for the API A3 and column API A2

Returning to the method of FIG. 5, user roles associated with a user session may be identified at step 540. A user role may vary based on the application, and be characterized as a customer, administrator, manager, director, agent, and so forth. In some instances, a user session may be associated with a single user role. For each user role, there may be a set of particular APIs that are accessed, which may differ between different roles. The correlation between user role and accessed APIs, time of day access for a particular role, and other data within the API traffic associated with the user role may be stored as correlation data for the role.

Each correlation identified in method 5 can be stored for a user session. Once a correlation occurs a threshold number of times, and/or or a threshold number of different users, correlation data can be generated for the correlation and stored for later comparison against subsequent user sessions. For example, a correlation may need to occur at least twenty times and over five different users before correlation data is generated based on the correlation. In some instances, a moving window of a set period of time is used to update the correlation data, for example of a period of 5 days, 10 days, two weeks, or some other timer period.

Figure 7:
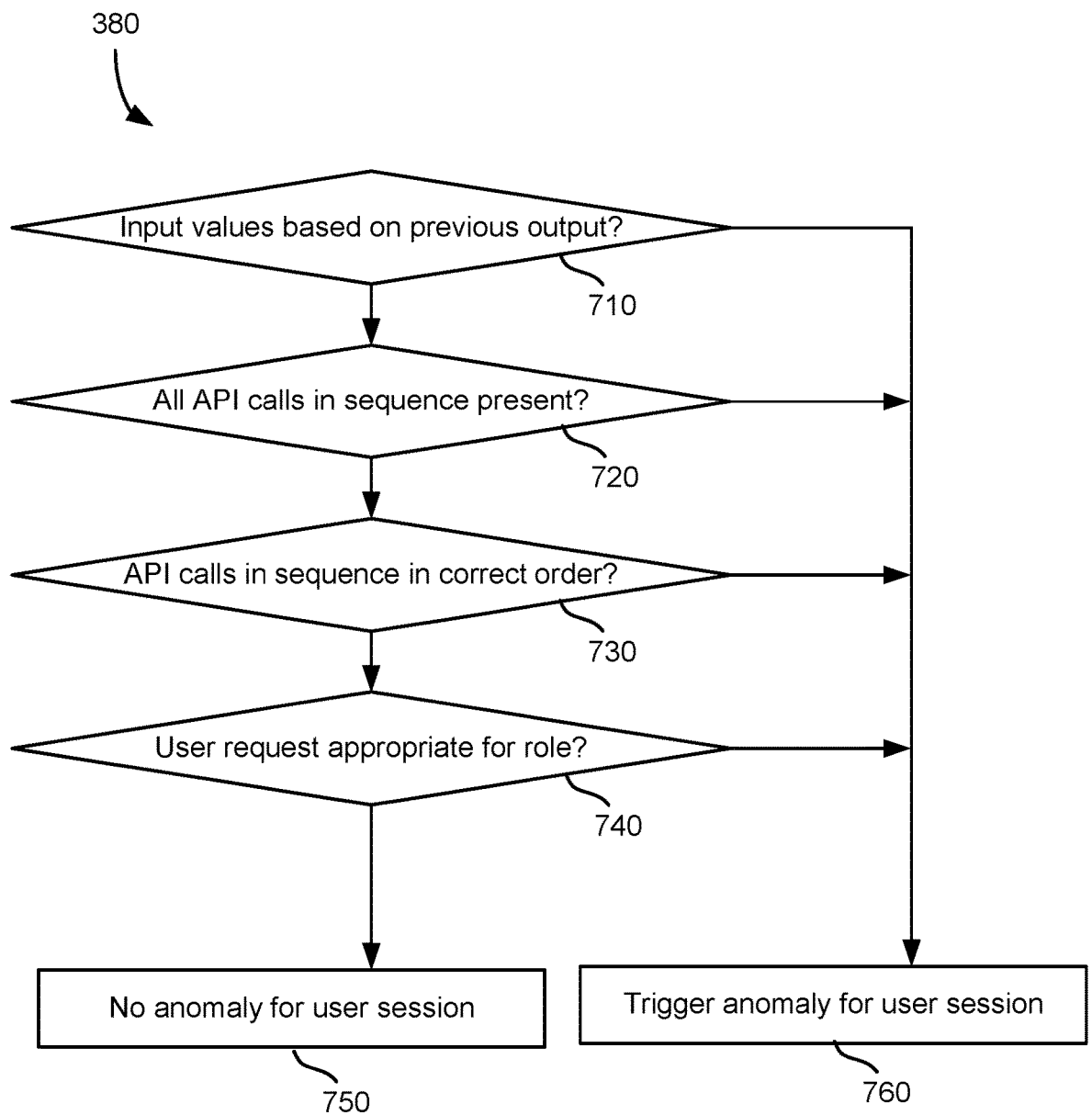
FIG. 7 is a method for comparing detected subsequent user sessions to stored correlation data.

FIG. 7 is a method for comparing detected subsequent user sessions to stored correlation data. The method of FIG. 7 provides more detail for step 380 of the method of FIG. 3. First, a determination is made as whether input values are based on previous input at step 710. Input values based on previous input may include having input values of an API request be based on an API response previously received as output from a particular application. If request input values based on previous response out the values match or are within a prescribed range of previous correlation data, the method of FIG. 7 continues to step 720. If the request input values based on response output values do not comply with the previous correlation data, then an anomaly may be triggered for a user session at step 760.

A determination is made as to whether all API calls in a sequence present at step 720. If API calls in a subsequent user session match the API calls in a previous user sequence, the method of FIG. 7 continues to step 730. If the API calls in the present user sequence do not match the API calls in a previous user session, an anomaly may be triggered for the user session at step 760.

A determination is made as to whether the API calls in a current user session are in a correct order as compared to the order of APIs in a previous user session at step 730. If the API calls in a user sequence are in the correct order, the method continues to step 740. If API calls are not in the correct order for a current user session, an anomaly may be triggered for the user session at step 760.

A determination is made as whether a user request is appropriate for the detected user role for the current user session at step 740. If the user request is appropriate for the current role based on correlation data for a previous user session, the no anomaly for the user session is triggered at step 750. If the user request is not appropriate for the current user role as compared to correlation data for previous user sessions, an anomaly may be triggered for the user session at step 760.

Figure 8:
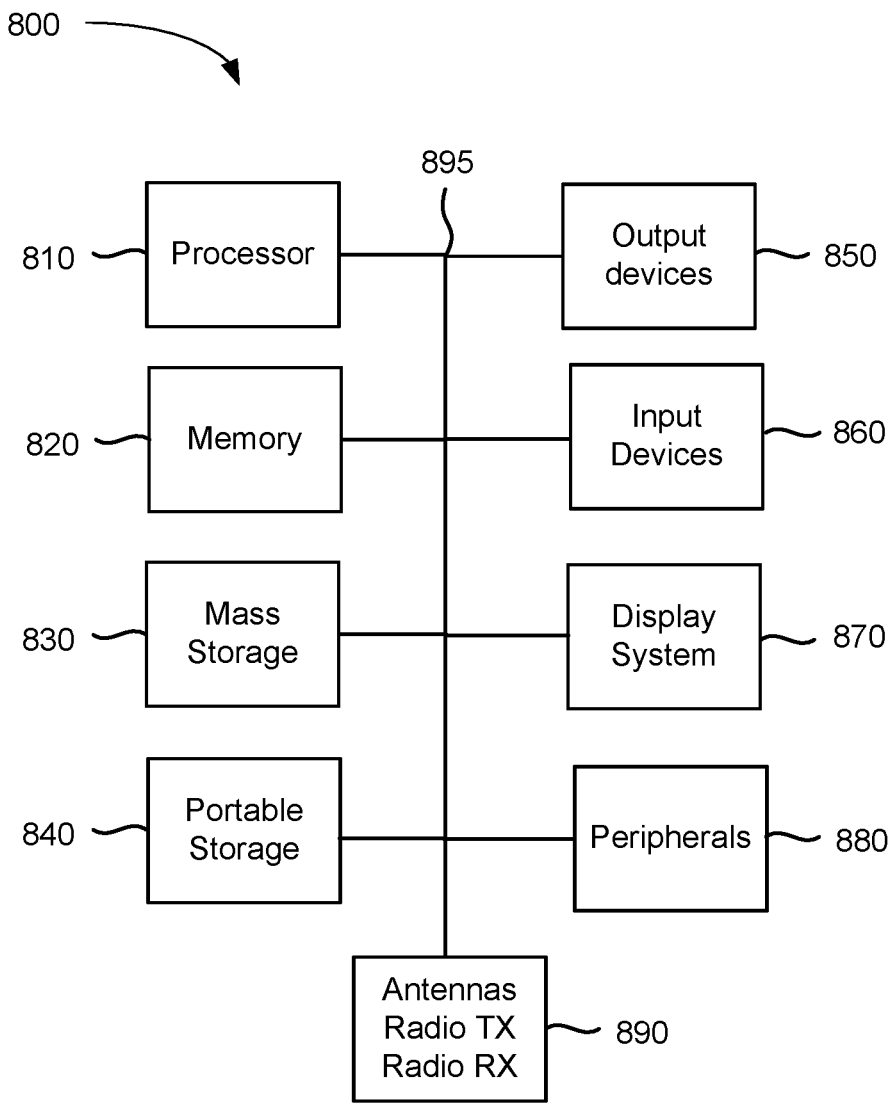
FIG. 8 is a block diagram of a system for implementing machines that implement the present technology.

FIG. 8 is a block diagram of a system for implementing machines that implement the present technology. System 800 of FIG. 8 may be implemented in the contexts of the likes of machines that implement client devices 110-140, customer server 150, Application server 80, and data store 180. The computing system 800 of FIG. 8 includes one or more processors 810 and memory 820. Main memory 820 stores, in part, instructions and data for execution by processor 810. Main memory 820 can store the executable code when in operation. The system 800 of FIG. 8 further includes a mass storage device 830, portable storage medium drive(s) 840, output devices 850, user input devices 860, a graphics display 870, and peripheral devices 880.

The components shown in FIG. 8 are depicted as being connected via a single bus 890. However, the components may be connected through one or more data transport means. For example, processor unit 810 and main memory 820 may be connected via a local microprocessor bus, and the mass storage device 830, peripheral device(s) 880, portable storage device 840, and display system 870 may be connected via one or more input/output (I/O) buses.

Mass storage device 830, which may be implemented with a magnetic disk drive, an optical disk drive, a flash drive, or other device, is a non-volatile storage device for storing data and instructions for use by processor unit 810. Mass storage device 830 can store the system software for implementing embodiments of the present invention for purposes of loading that software into main memory 820.

Portable storage device 840 operates in conjunction with a portable non-volatile storage medium, such as a floppy disk, compact disk or Digital video disc, USB drive, memory card or stick, or other portable or removable memory, to input and output data and code to and from the computer system 800 of FIG. 8. The system software for implementing embodiments of the present invention may be stored on such a portable medium and input to the computer system 800 via the portable storage device 840.

Input devices 860 provide a portion of a user interface. Input devices 860 may include an alpha-numeric keypad, such as a keyboard, for inputting alpha-numeric and other information, a pointing device such as a mouse, a trackball, stylus, cursor direction keys, microphone, touch-screen, accelerometer, and other input devices. Additionally, the system 800 as shown in FIG. 8 includes output devices 850. Examples of suitable output devices include speakers, printers, network interfaces, and monitors.

Display system 870 may include a liquid crystal display (LCD) or other suitable display device. Display system 870 receives textual and graphical information and processes the information for output to the display device. Display system 870 may also receive input as a touch-screen.

Peripherals 880 may include any type of computer support device to add additional functionality to the computer system. For example, peripheral device(s) 880 may include a modem or a router, printer, and other device.

The system of 800 may also include, in some implementations, antennas, radio transmitters and radio receivers 890. The antennas and radios may be implemented in devices such as smart phones, tablets, and other devices that may communicate wirelessly. The one or more antennas may operate at one or more radio frequencies suitable to send and receive data over cellular networks, Wi-Fi networks, commercial device networks such as a Bluetooth device, and other radio frequency networks. The devices may include one or more radio transmitters and receivers for processing signals sent and received using the antennas.

The components contained in the computer system 800 of FIG. 8 are those typically found in computer systems that may be suitable for use with embodiments of the present invention and are intended to represent a broad category of such computer components that are well known in the art. Thus, the computer system 800 of FIG. 8 can be a personal computer, handheld computing device, smart phone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, as well as languages including Java, .NET, C, C++, Node.JS, and other suitable languages.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for performing session-based anomaly detection, comprising:
intercepting Application Program Interface (API) traffic between a client and a server, the API traffic associated with multiple user sessions;
identifying a first user session identifier associated with one of the multiple user sessions, the first user session associated with a subset of the intercepted API traffic;
detecting correlations between a subset of the API traffic associated with the first user session, wherein the correlation includes a request that includes an input derived from an output included in a previous response during the session;
storing correlation data based on the detected correlations;
comparing the correlation data to subsequently intercepted API traffic associated with a second user session; and
determining whether the intercepted API traffic includes an anomaly based on the comparison with the correlation data.

2. The method of claim 1, wherein identifying the first user session identifier includes extracting a user identifier from a JSON object in an http header.

3. The method of claim 1, wherein identifying the first user session identifier includes retrieving the user identifier from a response received by the client, the response being subsequent to the first response received in the user session.

4. The method of claim 1, wherein identifying the first user session identifier includes retrieving an http header associated with an API associated with the user session.

5. The method of claim 1, wherein the correlation includes a sequence of APIs occurring in the session.

6. The method of claim 1, wherein the correlation includes role data for the user identifier associated with the session.

7. The method of claim 1, further comprising generating an alert based on the anomaly determination.

8. A non-transitory computer readable storage medium having embodied thereon a program, the program being executable by a processor to perform a method for performing session-based anomaly detection, the method comprising:
intercepting Application Program Interface (API) traffic between a client and a server, the API traffic associated with multiple user sessions;
identifying a first user session identifier associated with one of the multiple user sessions, the first user session associated with a subset of the intercepted API traffic;
detecting correlations between a subset of the API traffic associated with the first user session, wherein the correlation includes a request that includes an input derived from an output included in a previous response during the session;
storing correlation data based on the detected correlations;
comparing the correlation data to subsequently intercepted API traffic associated with a second user session; and
determining whether the intercepted API traffic includes an anomaly based on the comparison with the correlation data.

9. The non-transitory computer readable storage medium of claim 8, wherein identifying the first user session identifier includes extracting a user identifier from a JSON object in an http header.

10. The non-transitory computer readable storage medium of claim 8, wherein identifying the first user session identifier includes retrieving the user identifier from a response received by the client, the response being subsequent to the first response received in the user session.

11. The non-transitory computer readable storage medium of claim 8, wherein identifying the first user session identifier includes retrieving an http header associated with an API associated with the user session.

12. The non-transitory computer readable storage medium of claim 8, wherein the correlation includes a sequence of APIs occurring in the session.

13. The non-transitory computer readable storage medium of claim 8, wherein the correlation includes role data for the user identifier associated with the session.

14. The non-transitory computer readable storage medium of claim 8, further comprising generating an alert based on the anomaly determination.

15. A system for automatically forecasting values for system metric time series, comprising:
a server including a memory and a processor; and
one or more modules stored in the memory and executed by the processor to intercept Application Program Interface (API) traffic between a client and a server, the API traffic associated with multiple user sessions, identify a first user session identifier associated with one of the multiple user sessions, the first user session associated with a subset of the intercepted API traffic, detect correlations between a subset of the API traffic associated with the first user session, wherein the correlation includes a request that includes an input derived from an output included in a previous response during the session; store correlation data based on the detected correlations, compare the correlation data to subsequently intercepted API traffic associated with a second user session, and determine whether the intercepted API traffic includes an anomaly based on the comparison with the correlation data.

16. The system of claim 15, wherein identifying the first user session identifier includes extracting a user identifier from a JSON object in an http header.

17. The system of claim 15, wherein identifying the first user session identifier includes retrieving the user identifier from a response received by the client, the response being subsequent to the first response received in the user session.

18. The system of claim 15, wherein the correlation includes a sequence of APIs occurring in the session.

* * * * *